United States Patent [19]

Alley

[11] 4,250,544
[45] Feb. 10, 1981

[54] COMBINATION MICROPROCESSOR AND DISCRETE ELEMENT CONTROL SYSTEM FOR A CLOCK RATE CONTROLLED ELECTRONICALLY COMMUTATED MOTOR

[75] Inventor: Robert P. Alley, Manlius, N.Y.

[73] Assignee: General Electric Company, Louisville, Ky.

[21] Appl. No.: 109,586

[22] Filed: Jan. 4, 1980

[51] Int. Cl.³ .................... G06F 15/46; H02P 6/02
[52] U.S. Cl. ................... 364/110; 318/138; 318/254; 318/439; 318/696
[58] Field of Search ............ 318/138, 254, 439, 696; 364/107, 110, 118

[56] References Cited

U.S. PATENT DOCUMENTS

| | | | |
|---|---|---|---|
| 3,988,578 | 10/1976 | Weber | 364/118 |
| 4,090,116 | 5/1978 | Lippitt | 364/107 |
| 4,145,643 | 3/1979 | Maeda et al. | 318/696 |
| 4,162,435 | 7/1979 | Wright . | |

Primary Examiner—J. V. Truhe
Assistant Examiner—John W. Redman
Attorney, Agent, or Firm—Radford M. Reams

[57] ABSTRACT

A motor velocity control system employing feedback to maintain actual motor rotational velocity at or near a desired rotational velocity implements a clock rate control motor rotational velocity system by advantageously apportioning the required functions between a relatively small, slow speed microprocessor, and a plurality of discrete circuit elements in the form of analog and digital logic devices. The microprocessor serves the following four general functions: (1) as a "basic clock" timer of variable rate to set up motor speed; (2) as a relatively slow speed determiner of when various components are to be switched for commutation, and for indicting to an integrator circuit which motor winding is currently unenergized and which therefore may be sampled for determining rotor actual position; (3) as a digital feed to a digital to analog (D/A) converter for setting a motor winding current limit; in accordance with the principles of the Alley; and (4) as a communication link to receive velocity and direction commands, preferably in the form of a plurality of points defining a waveform profile or envelope. Discrete analog and digital logic elements are employed to implement the functions of analog integration and comparison with the integral limit, as well as current comparison and chopper control.

8 Claims, 9 Drawing Figures

COMBINATION MICROPROCESSOR AND DISCRETE ELEMENT CONTROL SYSTEM FOR A CLOCK RATE CONTROLLED ELECTRONICALLY COMMUTATED MOTOR

CROSS-REFERENCE TO RELATED APPLICATIONS

The present invention is a specific embodiment of the invention comprising the subject matter of a commonly assigned application Ser. No. 109,579, filed Jan. 4, 1980 by Robert P. Alley and Richard C. Weischedel entitled "Clock Rate Control of Electronically Commutated Motor Rotational Velocity."

BACKGROUND OF THE INVENTION

The present invention relates to a motor velocity control system employing feedback to maintain actual motor rotational velocity at or near a desired rotational velocity and, more particularly, to such a motor control system which implements a clock rate control motor rotational velocity system by advantageously apportioning the required functions between a relatively small, slow speed microprocessor, and a plurality of discrete circuit elements in the form of analog and digital logic devices.

The above identified, commonly assigned Alley and Weischedel Application Ser. No. 109,579 describes a motor velocity control concept particularly intended, but not so limited, for application in a direct drive domestic clothes washing machine wherein, through suitable input control signals, a DC motor is controlled as to both rotaional velocity and direction to effect desired agitator motions.

More particularly, in the above-identified commonly assigned Alley and Weischedel Application Ser. No. 109,579, desired motor rotational velocity is commanded by an input clock rate, which may be variable, rather than by a voltage or current signal. A sensor is provided for determining actual rotor position, and actual rotor position is periodically compared with instantaneous desired rotor position as indicated by the time of occurance one of the input signals or pulses. Depending upon the results of this periodic comparision, a dynamically established active current limit is modified. Specifically, if motor rotor actual position leads desired position, the current limit is reduced. If, on the other hand, actual motor position is lagging desired motor position, the current limit is increased.

As pointed out in that application, this control action occurs simultaneously with conventional winding commutation taking place under the control of a commutation sequencer periodically advanced in conventional fashion as the rotor reaches each of a plurality of predetermined positions.

The particular system described in the Alley and Weischedel Application Ser. No. 109,579 is a so called hard wired implementation comprising a plurality of integrated circuit devices such as CMOS digital logic devices, and analog comparators and operational amplifiers.

It is recognized that, with the widespread use of relatively low cost microprocessors in a wide variety of products, microprocessor control of a device, such as a clothes washing machine, which includes a velocity controlled electronically commutated motor is a likely and desirable end. In particular, the optional cycle sequencing aspects of the control system of such a device readily lend themselves to microprocessor control. Moreover, it has been recognized that different agitator velocity (or instantaneous position) profiles, other than the commonly employed sinusoidal profile, are desirable or beneficial in clothes washing. An agitator velocity motion profile may be described as a waveform having a frequency in the order of one or two hertz, and may be a simple sinusoid, or some other waveform such as triangular or trapesoidal.

It is envisioned that such a velocity profile waveform might conveniently be stored in a memory, such as a read only memory (ROM) as a plurality of discrete points along a curve. For example, it has been determined that in the order of sixteen points are adequate to define a clothes washing machine agitator velocity profile which provides sufficiently smooth operation when advancing from one point to the next.

As pointed out in the above referenced commonly assigned Alley and Weischedel Application Ser. No. 109,579, a preferred method of periodically determining actual rotor position is that which is described in the commonly assigned Wright U.S. Pat. No. 4,162,435. Briefly, in the approach described in the Wright patent, induced voltage is sensed across an unenergized motor winding, and that voltage sample is integrated and compared to a reference voltage. When the integral exceeds the reference voltage, the system recognizes that a predetermined rotor position has been reached, and the commutation sequence proceeds to the next step.

It will be appreciated that a microprocessor based computer control system may readily be devised to implement all of the required functions of a clock rate control motor velocity control system, including the integration and integration limit functions. However, for such a system to operate in real time to continuously provide commutation and update the current limit as required during motor rotation would require a relatively fast microprocessor, with attendant expense.

SUMMARY OF THE INVENTION

Accordingly, it is an object of the invention to provide a computer or microcomputer based implementation of the concept of controlling motor rotational velocity based on clock rate control, which concept comprises the subject matter of the above identified Alley and Weischedel application, and to do so in an efficient manner.

Briefly stated, and in accordance with a broad concept of the present invention, the required functions are apportioned between a relatively small, slow moving microcomputer comprising a microprocessor and a number of discrete analog and digital logic circuit elements. In accordance with this overall concept of the invention, the microprocessor serves the following four general functions:

(1) The microprocessor serves as a "basic clock" timer of variable rate to set up motor speed. Such a function is readily implemented by a microprocessor using programmable digital divider techniques. In particular, a source of substantially fixed rate basic clock pulses is provided, and these pulses are counted by a previously initialized counter until a count limit is reached. Each time the limit count is reached, a position clock pulse is produced representative of a desired rotor position. Thus, it will be appreciated that the position clock pulses so generated occur at a rate inversely proportional to the established counting limit.

(2) The microprocessor also serves as a relatively slow speed determiner of when various components are to be switched for commutation, and for indicating to the integrator circuit which motor winding is currently unenergized and which therefore may be sampled in accordance with the teachings of the commonly assigned Wright U.S. Pat. No. 4,162,435. This switching function may be relatively easily implemented under microprocessor control, and may quite simply comprise incrementing or decrementing a simple counter, depending upon the desired direction of motor rotation. Decoding of the sequencer count to actually enable the appropriate switching devices may be done either by means of a table or programming sequence within the microprocessor itself, or may be done by means of external decoders decoding signals output by the microprocessor along address lines.

(3) The microprocessor also serves as a digital feed to a digital to analog (D/A) converter for setting the current limit in accordance with the principles of the Alley and Weischedel invention comprising the subject matter of Application Ser. No. 109,579. Additionally, the integration limit for rotor position sensing may similarly be set.

(4) Lastly, the microprocessor may serve as a communications link to receive velocity and direction commands, preferably in the form of a plurality of points, for example, sixteen, defining a waveform profile or envelope.

In accordance with the invention, discrete analog and digital logic elements are employed to implement the functions of analog integration and comparison with the integral limit, as well as current comparison and chopper control. Integration in particular may readily and quite satisfactorily be implemented by analog techniques, thus obviating the need for integration by digital techniques, which requires program complexity, analog to digital conversion, and a relatively fast microcomputer to accomplish in real time.

Briefly stated, and in accordance with a particular aspect of the invention, a hybrid microcomputer/discrete element control system for an electronically commutated motor having a rotor and a plurality of stator windings operable to produce magnetic fields in response to selective winding energization includes a source of substantially fixed rate basic clock pulses, and further includes a digital computer operating under stored program control. The computer has memory elements for storing data, the memory elements including a present commutation interval register serving as a commutation sequence counter, a clock-pulses-per-interval register serving to record a representation of desired rotational velocity, an interval counter register serving to accumulate a count of basic clock pulses for comparison with the contents of the clock-pulses-per interval register, and an established current limit register. The system includes means, either internal or external to the microcomputer, for periodically receiving data stored in the commutation interval register and for selectively energizing the motor windings in response to the received data in a manner appropriate for effecting motor rotation as data stored in the commutation interval register changes. The system additionally includes an integrator external to the microcomputer, operable to integrate, with respect to time from an initial state, sampled voltage induced in a motor winding not currently energized, thereby to develop a voltage integral. Associated with the integrator is a controlled selector switch means for periodically receiving data stored in the commutation interval register and for selectively connecting the input of the integrator to a currently unenergized motor winding.

The system additionally includes a comparator operable to compare the voltage integral to a predetermined reference voltage level and to provide an output signal when the voltage integral exceeds the reference voltage level indicating the rotor has reached a predetermined angular position, and there is provided a means enabling the computer to periodically sense the output of the comparator in order to know when the voltage integral has reached the limit.

In order to implement the current control, there is provided a means for periodically receiving and storing a representation of data in the established current limit register, means for sensing current through energized motor windings, a comparator for comparing sensed motor winding current with the stored representation of data in the established current register, and a controlled switching device responsive to the output of the comparator and connected to interrupt energization of an energized motor winding when sensed current exceeds the established limit, and to restore motor winding energization when sensed current limit falls below the established current by at least a predetermined amount.

The digital computer functions, in a relatively inner program loop, to operate the present commutation interval register as a sequence counter by periodically incrementing or decrementing the count representation stored therein, and to transmit these register contents as data to the means for selectively energizing the motor windings and to the controlled selector means for the integrator. This is done by incrementing the interval counter register in reponse to fixed rate basic clock pulses until the contents of the interval counter register have a predetermined relationship, for example equal to or greater than, the contents of the clock pulses per interval register, and outputing a command clock pulse to increment the present commutation interval register upon this occurance.

While this inner program loop is executing, the digital computer is operable to periodically sense the output of the comparator which compares the voltage integral to a predetermined reference voltage level, and adjusts the contents of the established current limit register depending upon the relative times of occurance of the postion clock pulses and the integral comparator output signal. In particular, the current limit is decreased in the event the integral comparator output signal preceeds the command clock pulse, and the current limit is increased in the event the integral comparator output follows the command clock pulse.

Preferably, the computer is additionally operable in an outer loop relating particularly to an agitator velocity profile. In connection with this outer loop, the computer has further memory elements for storing data including a table comprising a plurality of velocity contour points, a present contour point pointer register serving to indicate which one of the velocity contour points is current. A clock-pulses-per-point register serving to record a representation of desired rate of advancement through the velocity contour points and a counter point counter register serving to accumulate a count of basic clock pulses for comparison with the contents of the clock pulses per point register.

In a manner similar to that used to generate the periodic poisition clock pulses, the computer is further operable to establish periodic contour point clock pulses by incrementing the contour point counter register in response to fixed rate basic clock pulses until the contents of the contour point counter register have a predetermined relationship to the contents of the clock pulses per point register. The computer is operable in response to these periodic contour point clock pulses to increment the present contour point pointer register and caused the data in the identified location in the velocity contour point table to be entered into the clock pulses per interval register to establish a new desired rotational velocity.

With the operation as described above, it will be apparent that the interval counter register repeatedly cycles a number of times, resulting in the generation of periodic command clock pulses, during each single cycle of the contour point counter register.

The digital computer additionally serves as a communications device to periodically receive input commands from an external source which preferably are a plurality of velocity contour points loaded into the table of velocity and direction contour points.

While a suitable computer program flow chart is described hereinbelow with particular reference to drawing FIGS. 5A and 5B, it will be appreciated that the present invention is not directed to a computer program per se. Rather, in accordance with the invention, it is contemplated that an element of the overall embodiment be a computer device in the form of a microcomputer, programmed using conventional techniques, and suitably interfaced with other devices in the system. It is further contemplated that the microcomputer program be permanently recorded in a read only memory (ROM) at the time of manufacture, and thus be an integral and unalterable part of the device. By way of example, and without in any way intending to limit to the scope of the claimed invention, a suitable microprocessor is one selected from the "TMS 1000" series of MOS/LSI one-chip microcomputers manufactured by Texas Instruments Incorporated. As described by Texas Instruments, the TMS 1000 series is a family of P channel MOS four-bit microcomputers with a ROM, a RAM, and an arithmetic logic unit on a single semiconductor chip. Thus, the device is a single chip binary microcomputer. A customer's specification determines the software which is reproduced during semiconductor wafer processing by a mask technique which defines a fixed ROM pattern.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE PREFERRED EMBODIMENT

Figure 1:
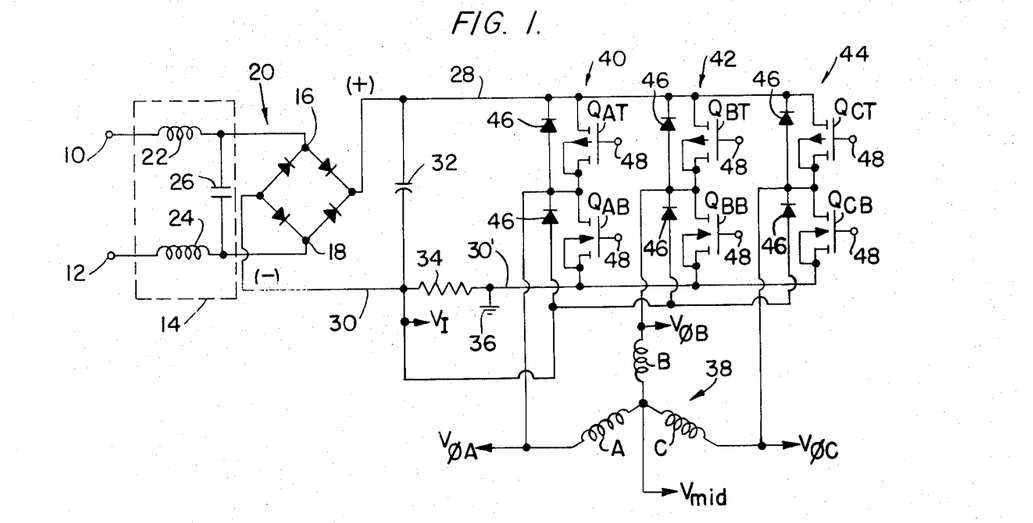
FIG. 1 is an overall electrical schematic diagram of the power handling portions of a circuit for controlling a three phase electronically commutated motor (ECM)

With reference now to the drawings wherein identical reference numerals represent similar or corresponding elements throughout the various diagrams, in FIG. 1, 120 volts, 60 Hz AC from a conventional household branch circuit is applied to AC input terminals 10 and 12 connected through an electromagnetic interference (EMI) filter 14 to the AC input terminals 16 and 18 of a full wave bridge rectifier 20. As indicated, the EMI filter 14 may comprise a pair of series inductors 22 and 24, each for example having an inductance of 250 microhenries, with a 0.05 microfarad capacitor 26 in shunt on the output side of the EMI filter 14. For additional system protection, a 150 volt metal oxide varistor (MOV) (not shown) may be connected on the output side of the EMI filter 14.

The pulsating DC output of the bridge rectifier 20 is applied to respective positive and negative DC supply conductors 28 and 30, and a low value filter capacitor 32 is connected across the DC supply conductors 28 and 30. The capacitor 32 is sized to further reduce electromagnetic interference and to provide adequate local energy storage for supplying chopping components of current while, at the same time, having minimum adverse impact upon input power factor. The voltage across the DC supply conductors 28 and 30 thus remains a relatively high ripple DC input voltage or, expressed alternatively, substantially unfiltered rectified AC power.

In order to sense the instantaneous current supplied to the remaining elements of FIG. 1, a 0.05 ohm current sensing resistor 34 is connected in series between the negative DC supply conductor 30 and an extension 30' thereof. A current sensing line $V_I$ is connected to one terminal of the current sensing resistor 34 to sense the voltage drop thereacross. The current sensing signal on the $V_I$ line is referenced to a circuit reference point 36 connected to the extended negative DC supply conductor 30'.

At the right hand side of FIG. 1 is shown an electronically commutated (ECM) bi-directional, variable speed DC motor generally designated 38 intended for application in a direct drive clothes washing machine. More particularly, the motor 38 is represented by stator windings A, B and C, connected in a "Y" configuration. It will be appreciated that the motor 38 requires a rotor, such as a conventional permanent magnet rotor (not shown) which rotates in either direction depending upon the energization sequence of the windings A, B and C.

Electrical connections to the ends of the windings A, B and C of the motor 38 are respectively identified as $V_{\phi A}$, $V_{\phi B}$ and $V_{\phi C}$. The midpoint connection, employed for sensing purposes, is identified as $V_{mid}$.

Connected to the windings A, B and C of the motor 38 and supplied from the positive and negative DC supply conductors 28 and 30' are three power switching sections respectively designated 40, 42 and 44. Generally speaking, each of the switching sections 40, 42 and 44 comprises a power switch which is capable of connecting the end of the respective motor winding A, B or C to either the positive supply line 28 or the negative supply line 30'. For motor 38 winding A, the top switch is designated $Q_{AT}$, and the bottom power switch is designated $Q_{AB}$. The same nomenclature is employed for similar power switches the other two switching sections 42 and 44.

For purposes of illustration, the power switches are illustrated as power field effect transistors capable of switching 200 volts DC, with three amperes average current, and ten amperes peak current. However, other switching devices may equally well be employed, such as bipolar transistors.

In the particular circuit illustrated, the upper power switches for connecting respective winding ends to the positive DC supply conductor 28 are depletion mode power field effect transistors $Q_{AT}$, $Q_{BT}$ and $Q_{CT}$. For the lower switching transistors which serve to connect the motor winding ends to the negative DC supply conductor 30', enhancement mode power field effect transistors $Q_{AB}$, $Q_{BB}$ and $Q_{CB}$ are employed. Also shown in FIG. 1 are free wheeling diodes 46 connected across the respective source and drain terminals of the power switching transistors.

In the general operation of the circuit of FIG. 1, suitable gate drive signals are applied to the power switching transistor gate terminals 48. As is more fully explained hereinbelow, both the top switching transistors $Q_{AT}$, $Q_{BT}$ and $Q_{CT}$ and the bottom switching transistors $Q_{AB}$, $Q_{BB}$ and $Q_{CB}$ are used for the commutating function. The top switching transistors $Q_{AT}$, $Q_{BT}$ and $Q_{CT}$ are additionally rapidly switched on and off in chopper fashion (time ratio control) during each commutation cycle in order to limit average current through whichever of the motor windings A, B and C are energized at any given time. In this manner, effective applied motor voltage is controlled to be that required to maintain motor velocity, with the inductance of the motor windings A, B and C providing voltage smoothing.

Figure 2:
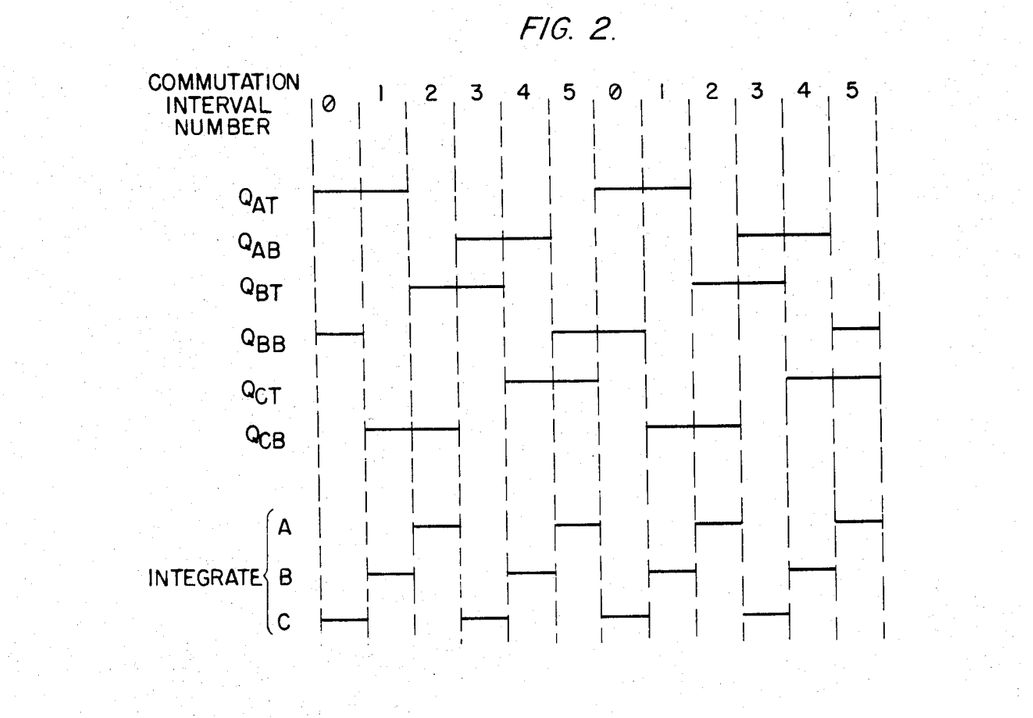
FIG. 2 is a commutation sequence diagram depicting the overall operation of the FIG. 1 circuits.

The general manner in which the motor 38 is operated will now be described with particular reference to the timing sequence chart of FIG. 2. In FIG. 2, each rotation cycle of the motor 38 is divided into six commutation intervals identified as $\phi$, 1, 2, 3, 4 and 5, each of the commutation intervals representing sixty electrical degrees. The commutation sequence continuously repeats in one direction or the other, depending upon whether clockwise or counterclockwise motor rotation is desired, and at a frequency dependent upon motor speed. It will be appreciated that while the particular sequence shown for purposes of illustration is for a "Y" connected three winding motor, other sequences are appropriate for other motor winding configurations, and the particular sequence shown is in no way intended to limit the scope of the invention.

In FIG. 2, the series of lines designated $Q_{AT}$ through $Q_{CB}$ designate specifically during which of the commutation intervals the power switching transistors of FIG. 1 are energized. It will be seen that, at any instant, one of the top switching transistors $Q_{AT}$, $Q_{BT}$ or $Q_{CT}$ is energized and one of the bottom switching transistors $Q_{AB}$, $Q_{BB}$ or $Q_{CB}$ is energized, thus energizing two of the three motor 38 windings A, B and C by appropriately connecting respective ends thereof to the positive and negative DC supply conductors 28 and 30'. The commutation sequence shown results in motor rotation in one direction as interval numbers repeatedly count up going from left to right across the drawing sheet, and results in motor rotation in the other direction as the interval numbers repeatedly count down going from right to left across the drawing sheet.

In the illustrated sequence, it will be seen that at any instant two of the motor windings A, B and C are energized, and one is unenergized. In accordance with the teachings of the commonly-assigned Wright U.S. Pat. No. 4,162,435, the entire disclosure of which is hereby incorporated by reference, the induced voltage across an unused winding is sensed and integrated as an indicator of rotor position. Thus the "Integrate" A, B and C lines of FIG. 2 indicate the time intervals during which the voltage across each of the motor windings A, B and C is respectively sensed and integrated to provide position information.

Figure 3:
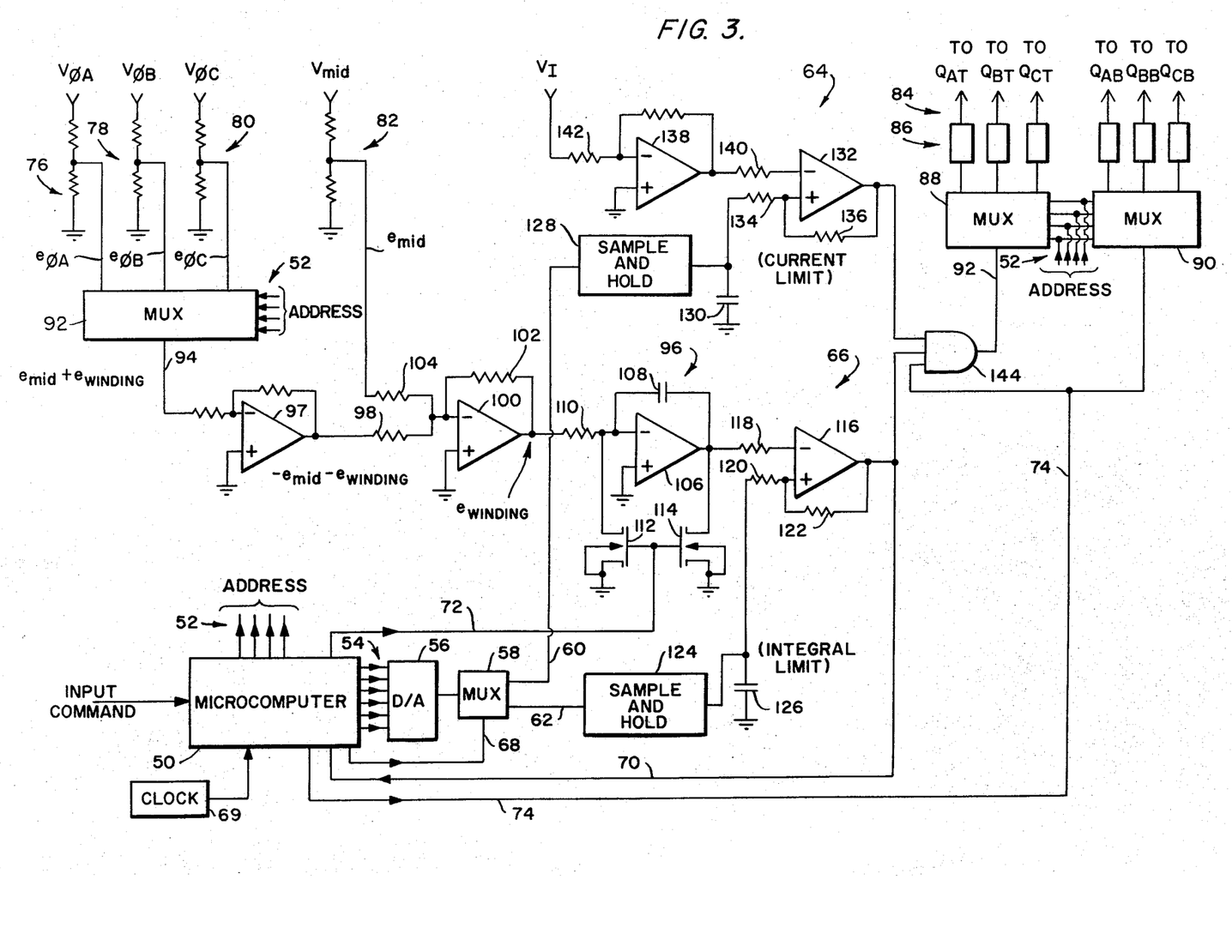
FIG. 3 is an electrical schematic diagram showing an arrangement in accordance with the present invention connected to the power handling portions of the circuit illustrated in FIG. 1.

With reference now to FIG. 3, the circuitry which directs the power handling circuit of FIG. 1 will now be described in detail. In FIG. 3, a microcomputer 50 performs a number of relatively slow speed control functions as outlined above, as well as serving as a communication device to receive input commands. As noted above, a suitable microcomputer is one manufactured by Texas Instruments Inc. under their "TMS 1000" series, or equivalent one-chip microcomputer. Important outputs of the microcomputer 50 are signals on address lines 52 which serve to indicate to the remainder of the circuitry the particular interval in a commutation sequence, and thus which of the FIG. 1 power switching transistors are to be energized, as well as which of the motor windings A, B or C is currently unenergized and thus may be sampled such that induced voltage therein may be integrated and compared to a limit in order to provide a signal when motor rotor actual position reaches a predetermined position.

The microcomputer 50 additionally outputs along data lines 54 a digitally encoded number indicating a particular current limit value for motor winding current, and optionally, an integral limit voltage reference. To this end, the data output lines 54 are connected to a digital to analog (D/A) converter 56, the output of which is connected through a multiplexer (MUX) 58 supplying output lines 60 and 62 which respectively supply analog voltage levels to current limit comparator circuitry 64 and integral limit comparator circuitry 66. A microcomputer output line 68 controls the multiplexer 58.

For timing information, a microcomputer 50 input is connected to a source 69 of substantially fixed rate basic clock pulses, which may, in conventional fashion, supply an interrupt input.

A microcomputer input line 70 permits the microcomputer 50 to periodically sample the output of the integral limit comparator circuitry 66 in order to receive information concerning motor rotor actual position.

Additional microcomputer 50 output lines are a line 72 which serves as an integrator reset line, and an output line 74 which serves to enable the power switching devices of FIG. 1 and thus serves as a means enabling the microcomputer 50 to shut down motor winding energization when appropriate.

While the various input and output connections to the microcomputer 50 are shown in a rather general form, it will be appreciated that input and output techniques for such microcomputers are well known in the art, and may readily be implemented by reference to the manufacturer's data sheets for the particular device selected.

For example, a Texas Instruments microcomputer of the "TMS 1000" series has ample input/output capability. In particular, the TMS 1000 has four data input lines ("K" lines), thirteen "R" outputs which are individually set and reset under program control, and eight "0" outputs decoded from five data latches.

The FIG. 3 circuitry senses votages across the three motor windings A, B and C through respective input voltage dividers 76, 78 and 80, and senses motor midpoint voltage through an input voltage divider 82. As indicated in the drawing, the sampled voltage output from the voltage dividers are respectfully designated $E_{\phi A}$, $E_{\phi B}$, $E_{\phi C}$ and $E_{mid}$.

An additional input to the FIG. 3 circuitry is the $V_I$ current sense line which samples the voltage across the current sensing resistor 34 in order to sense motor winding current.

Outputs from the FIG. 3 control circuitry to the FIG. 1 power handling circuit are six lines 84 bearing the designations of particular ones of the six power switching transistors FIG. 1, and which will be understood to be connected to corresponding ones of the power field effect transistor gate terminals 48 of FIG. 1.

The lines 84 are supplied through suitable drivers 86 of conventional design, which serve to interface the digital logic levels of the FIG. 3 circuit with the drive requirements of the particular power switching transistors selected for the FIG. 1 circuit.

In order to provide conventional motor commutation, a pair of multiplexers 88 and 90 supply the gate driver lines 84 through the driver circuitry 86 in accordance with the pattern of the FIG. 2 commutation sequence chart, or a similar sequence appropriate for a particular motor winding configuration. The multiplexers 88 and 90 are digital multiplexers which serve to effectively connect their respective input lines 92 and 94 to one of the three output lines, selected by binary coded signals on the address lines 52. It will be appreciated that conventional latching circuitry and chip enabling control circuitry (not shown) may be required between the address line 52 and the multiplexers 88 and 90, depending upon the details of the particular output arrangement selected as a matter of design for the microcomputer 50.

In operation, the multiplexer 88 serves to enable the gating of one of the three "top" power switching transistors of FIG. 1 and the multiplexer 90 serves to enable the gating of one of the three "bottom" switching transistors of FIG. 1. Thus, the multiplexers 88 and 90 serve as a means for periodically receiving data stored in the commutation interval register comprising an element of the microcomputer 50, and for selectively energizing the motor windings A, B and C in response to the received data in a manner appropriate for effecting motor rotation as the data stored in the commutation interval register changes.

While the commutation sequence of FIG. 2 is proceeding, the voltage across the one motor winding A, B or C which is currently unenergized is sampled and integrated in accordance with the teachings of the above referenced commonly assigned Wright U.S. Pat. No. 4,162,435. Specifically, the $e_{\phi A}$, $e_{\phi B}$, and $e_{\phi C}$ lines from the input voltage divider 76, 78, and 80 are connected to three input lines of an analog multiplexer 92, which functions to connect the input lines one at a time to the multiplexer output line 94 depending upon the address input. As in the case of the multiplexers 88 and 90, the address input lines 52 may require, depending upon the particular microcomputer 50 output arrangement selected, latches. The multiplexer 92 thus serves as a controlled selector switch means for periodically receiving data stored in the commutation interval register and for selectively connecting the input of an integrator 96 to a currently unenergized motor winding.

From FIG. 1, it will be appreciated that none of the motor winding end connections $V_{\phi A}$, $V_{\phi B}$ or $V_{\phi C}$ provides voltage across the particular winding directly, due to the "Y" connected arrangement. In particular, the $V_{\phi A}$ line provides the voltage across the winding A plus to midpoint voltage, and the $V_{mid}$ line provides a motor midpoint voltage.

In order to derive a scaled representation of the voltage across a particular winding with reference to the circuit reference point 36, the voltage on the particular $e_{\phi}$ lines selected by the analog multiplexer 92 is, in effect, subtracted from the representative midpoint voltage on the $E_{mid}$ line.

To accomplish this, the multiplexer 92 output line 94 is first connected through an inverting buffer amplifier 97, the output of which is connected through a suitable input resistor 98 to a summing operational amplifier 100 having a suitable feedback resistor 102. The $e_{mid}$ line is connected through another input resistor 104. Thus, the output of the summing operational amplifier 100 represents the voltage across a particular one of the windings A, B or C selected by the multiplexer 92, referenced to the circuit reference point.

The output of the summing amplifier 100 is connected to the integrator 96 which may be seen to comprise an operational amplifier 106 having a feedback capacitor 108 and an input resistor 110.

In order to periodically reset the integrator 96 to its initial state characterized by capacitor 108 voltage being zero a pair field effect transistors 112 and 114 are connected to shunt both ends of the capacitor 108 to the circuit reference point upon the occurance of a integrator reset signal along the line 72 from the microcomputer 50.

The output from the integrator 96 is applied to the integral limit comparator circuits 66 which more particularly may be seen to comprise an integrated circuit comparator device 116 having input resistors 118 and 120, with a positive feedback resistor 122 to provide hysteresis.

The voltage reference against which the integrator 96 integrated voltage output is compared is a predetermined reference voltage level stored in a conventional sample and hold circuit 124 including a representative capacitor 126 which is periodically connected to the output of the digital to analog converter 56 through the analog multiplexer 58 and the multiplexer output line 62.

In operation, the integrator 96 repeatedly goes through a cycle of initially being reset as the field effect transistors 112 and 114 are momentarily activated, and then proceeds to integrate sampled voltage across one of the motor windings A, B or C as determined by the multiplexer 92, until such time as the voltage integral applied to the input resistor 118 to the inverting (−) comparator 116 input exceeds the integral reference voltage applied through the input resistor 120 to the comparator 116 non-inverting (+) output, whereupon the comparator 116 output goes low.

In order to periodically establish and re-establish in dynamic fashion the motor winding current limit against which actual motor winding current is continuosly compared, the multiplexer 58 output line 60 is connected to a sample and hold circuit 128 including a representative capacitor 130 which comprises an element of the current limit comparator circuit 64. In particular, the current limit as represented by the voltage on the capacitor 130 is continuously increased or decreased as motor rotation proceeds, depending upon the results of periodic comparisons of actual motor rotor position with instantaneous desired rotor position generally in accordance with the invention comprising the subject matter of the above mentioned Alley and Weischedel Application Ser. No. 109,579.

As is explained more fully hereinafter, the current limit represented as a voltage stored in the capacitor 130 is updated from a stored representation of data in an established current limit register comprising a part of the microcomputer 50. Each time the current limit is to be changed, a digital representation of the new value thereof is output along the lines 54, converted to an analog voltage by the digital to analog converter 56, and directed to the sample and hold circuit 128 through the multiplexer 58.

The actual current comparison is accomplished by an integrated circuit comparator device 132 having its non-inverting (+) input connected as a reference input through a resistor 134 to the capacitor 130. For hysteresis, a positive feedback resistor 136 is also connected to the comparator 132 non-inverting (+) input.

Signals representative of actual motor winding current are connected to the comparator 132 inverting (−) input through an inverting buffer amplifier 138 and an input resistor 140, the inverting buffer amplifier 138 being connected to the $V_I$ current sense line through an input resistor 142.

In operation, the output of the comparator 132 goes low whenever actual motor winding current exceeds the established current limit. The output of the comparator 132 again goes high whenever actual motor current falls below the established current limit, at least by a predetermined amount as determined by the hysteresis resistor 136.

The remaining element in the FIG. 3 circuit is an AND gate 144 connected to the digital multiplexer 88 input line 92. In this particular circuit, the three upper transistors, $Q_{AT}$, $Q_{BT}$ and $Q_{CT}$ in the FIG. 1 circuit serve, in addition to their commutation function, the function of chopper control to periodically and rapidly energize and de-energize the selected motor windings within each commutation interval as required to prevent actual motor winding current from exceeding the established current limit. To this end, inputs of the AND gate 144 are connected to the current limit comparator 64 output, as well as to the enabling line 74 from the microcomputer 50.

Additionally, the output of the integral limit comparator 66 may optionally be applied as an input to the AND gate 144, thus de-energizing the selected motor windings until such time as the integrator 96 is reset and the commutation sequence is advanced. Depending upon the requirements of the particular system, this connection may be ommitted as, for example, where a slight amount of motor breaking action is desired in the event actual motor position leads instantaneous desired rotor position. In such event, if motor winding energization is maintained while advancement of the commutation sequence is delayed, a motor retarding force is developed.

FIGS. 4A through 4D are a representation of memory elements within the microcomputer 50 which are employed in conventional fashion to store, either permanently or temporarily, various items of data required for operation of the system. It will be appreciated that, depending upon the particular microcomputer hardware and software design, that the various memory elements depicted in FIGS. 4A through 4D may comprise, by way of example and not limitation, specific locations in random access memory (RAM), specific locations in read only memory (ROM), or high speed registers included within the microcomputer 50 architecture not comprising a part of addressable memory per se. Again, it will be appreciated that such details in and of themselves comprise no part of the present invention, and are simply a matter of design preference within the context of a particular microcomputer.

Figure 4A:
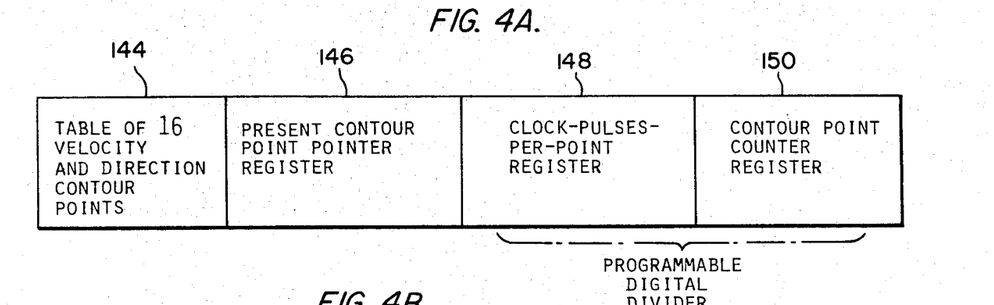
FIGS. 4A, 4B, 4C, and 4D are representations of storage elements in the form of memory locations or the like defined within the microcomputer device as an aid in implementing the required functions.

Referring to FIG. 4A in detail, a table 144 stores data defining sixteen velocity and direction contour points defining the profile of one clothes washing machine agitator cycle. This table may comprise either a permanent part of the memory, or may be periodically loaded in as part of an external input command directing the system of the present invention to establish a particular agitator motion profile. The selected profile may be a simple sinusoidal profile having a frequency in the order of one or two Hertz, or may be some other profile such as triangular or trapezoidal found to be useful in a particular clothes washing operation.

A present contour point pointer register 146 stores a numeric representation indicating which one of the sixteen contour points stored in the table 144 defines the motor velocity and direction which is to be maintained at any particular time. The present contour point pointer register is periodically incremented (or decremented) to select different items in the table 144.

In order to establish timing between the contour points stored in the table 144, what is effectively a programmable digital divider comprises a clock-pulses-per-point register 148 and a contour point counter register 150. The clock-pulses-per-point register is initially loaded and thereafter more or less permanently contains a numeric representation of the number of substantially fixed rate basic clock pulses which must occur to establish a timing for each of the velocity and direction contour point. Every time this particular number of fixed rate basic clock pulses have occured, an internal contour point clock pulse is generated and the present contour point pointer register 146 is advanced to point to the next contour point.

The actual count of fixed rate basic clock pulses for periodic comparison with the value in the register 148 is initialized and thereafter accumulated in the contour point counter register 150.

Thus, it will be appreciated that FIG. 4A defines memory elements most nearly associated with an outer loop which occurs under program control.

Figure 4B:
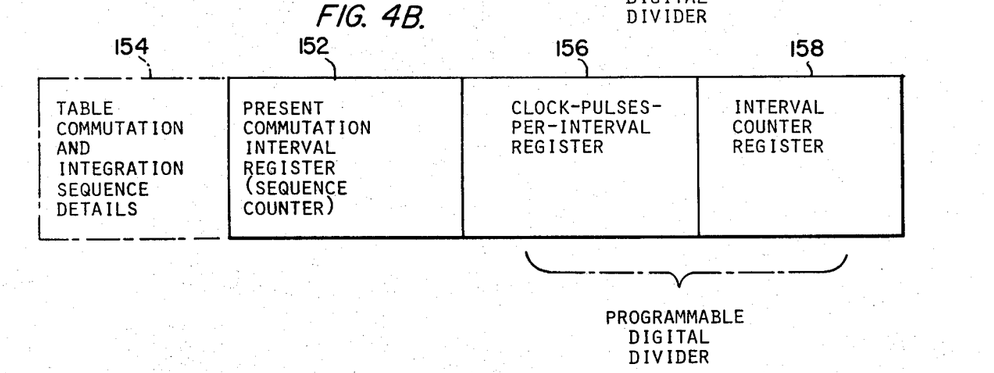

FIG. 4B shows similar information for each of the commutation intervals such are represented in the chart of FIG. 2. In particular, a present commutation interval register 152 functions as a sequence counter to indicate which one of the six commutation intervals is currently appropriate. Thus, incrementing or decrementing of the present commutation interval register 158 occurs during motor rotor rotation.

Shown in dash lines in FIG. 4B is a table 154 of commutation and integration sequence details. The table 154 in effect functions to decode the contents of the present commutation interval register 152 in order to specify individually which of the FIG. 1 switching transistors are to be selected via the FIG. 3 multiplexers 88 and 90, and which of the windings A, B or C is selected for integration by the FIG. 3 multiplexer 92. It will appreciated that such decoding is readily accomplished in a number of various ways, either internally or externally to the microcomputer 50. In the particular embodiment shown, substantial decoding is performed in the multiplexers 88, 90 and 92, although it will readily will be appreciated that such decoding may equally well be accomplished within the microcomputer 52.

Also shown in FIG. 4B are memory elements 156 and 158 which together define a programmable digital divider substantially identical in concept to that of FIG. 4A. In particular, the memory element 156 is defined as a clock-pulses-per-interval register and the memory element 158 is defined as an interval counter register. The clock-pulses-per-interval register 156 stores a number representative of how many fixed rate basic clock pulses elapse for each commutation interval, and to the interval counter register 158 serves to initialize and accumulate a count of basic clock pulses for comparison with the number stored in the clock pulses per interval register 156. The data stored in the clock pulses per interval register 156 therefore assumes great importance as the control determiner of motor rotational velocity. In particular, the numeric representation stored in the register 156 is inversely proportional to motor rotation velocity.

Figure 4C:
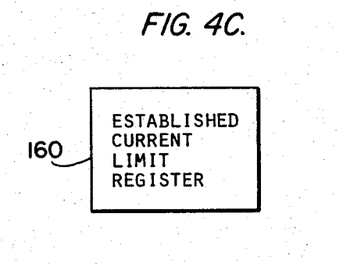

FIG. 4C represents an established current limit register 160 which is dynamically increased or decreased on the basis of periodic comparisons of motor rotor actual position with motor rotor instantaneous desired position, and the value in the established current limit register is periodically output via the FIG. 3 digital to analog converter 56 and multiplexer 58 to the current limit adjust circuit 64.

Figure 4D:
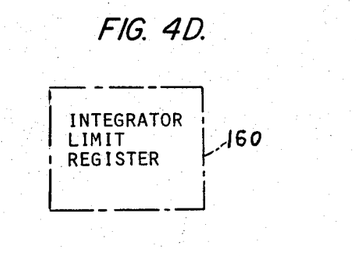

In similar fashion as represented in FIG. 4D, an integrator limit register 162 may be provided. Depending upon the requirements of a particular system, the integrator limit may be established as a matter of circuit design, or it may be desired to provide means for computer control thereover.

Figures 5A, 5B:
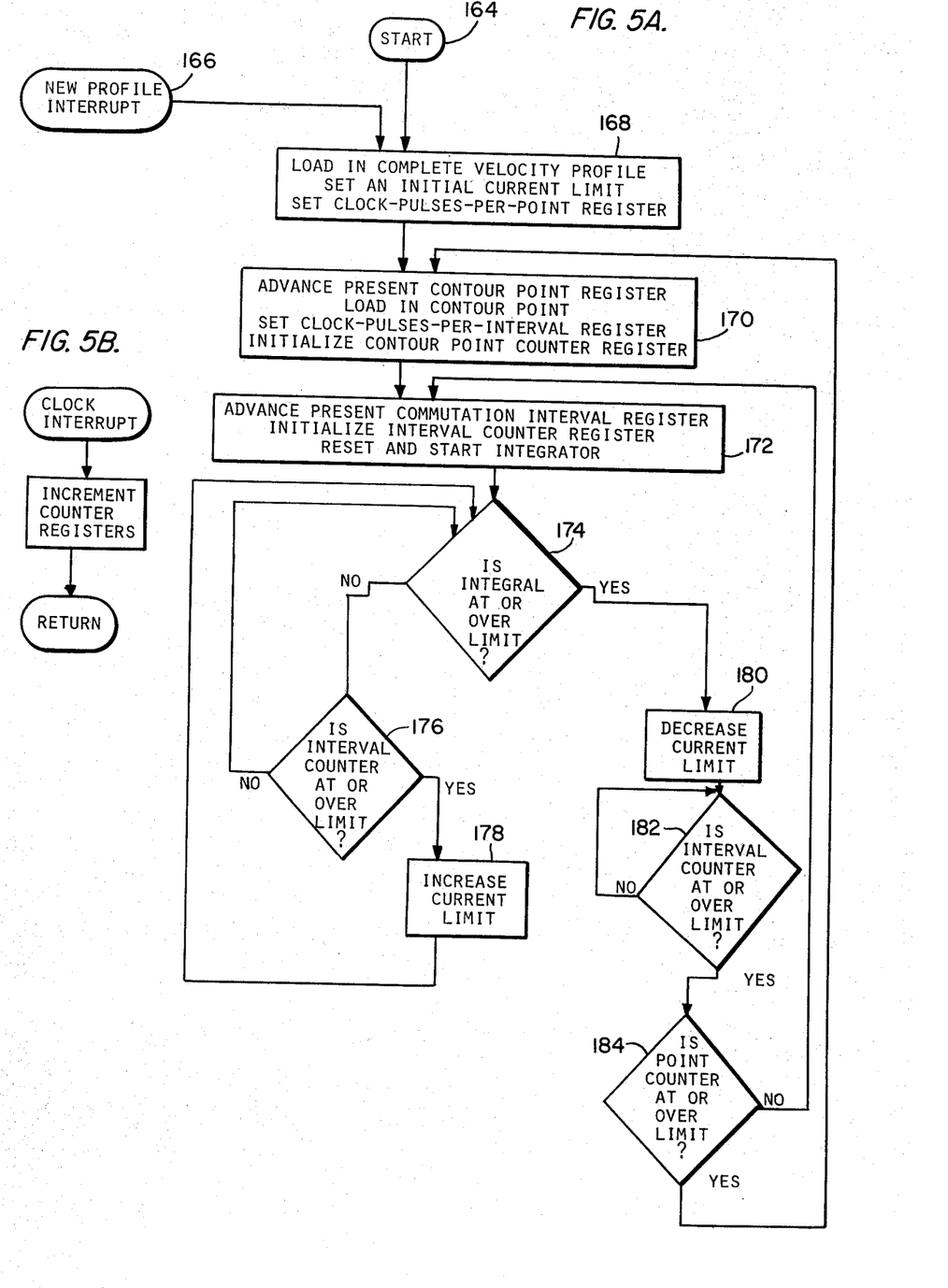
FIGS. 5A and 5B depict a representative program flow chart depicting operational steps performed within the microcomputer device to accomplish the required control functions.

Referring lastly to FIGS. 5A and 5B, there are illustrated representative of program flow charts depicting and exemplary sequence of operations within the microprocessor 50 which perform the required control functions. As noted above, the present invention is not directed to the program per se, but merely utilizes the capabilities of a suitably programmed microcomputer in a particularly advantageous fashion. The inclusion herein of the exemplary program flow charts of FIGS. 5A and 5B should in no way be taken as limiting the scope of the claimed invention, but merely represent in a general way the functions which the microcomputer thus perform, and one particular scheme for accomplishing these functions.

The FIG. 5A flow chart may be entered with either a start step 164 signifying initial operation of the system, or from a new profile interrupt entry point 166 which indicates to the microcomputer 50 that an external input command is asking that entirely new velocity profile be loaded in and executed.

The first real operational step is step 168 wherein complete velocity profile information is loaded into the table 144, an initial current limit found suitable for beginning operation is loaded into the established current limit register 160, and the clock-pulses-per-point register 148 is loaded to establish the time interval for each of the agitator motion contour points.

Next, in step 170, the present contour point pointer register 146 is initially advanced to the next point on the velocity profile, and initial data, for example from the table 144, for a particular velocity and direction point is loaded. Specifically, the important clock-pulses-per-interval register 156 is set with the number indicating desired rotational velocity. The number set in the register 156 is inversely proportional to velocity to be maintained. Additionally, the contour point counter register 150 is initialized to begin a timing period for the particular contour point selected.

Next, in step 172, the present commutation interval register (sequence counter) 152 is initially advanced, and the interval counter register 158 is initialized. Also, the integrator 96 is reset and started. As the present commutation interval register 152 is advanced, the data therein is transmitted to the multiplexer 92 to select a particular motor winding for sampling by the integrator 96, and additionally is transmitted to the multiplexers 88 and 90 for energizing appropriate power switching transistors.

At this point, the flowchart of FIG. 5B becomes relevant. FIG. 5B represents updating or incrementing of the contents of the contour point counter register 150 and the interval counter register 158 periodically in response to pulses from the FIG. 3 substantially fixed rate clock 69 employing conventional computer interrupt techniques. It will be appreciated that most of the time the program represented by the FIG. 5A flowchart is executing, with momentary interruptions to service the FIG. 5B routine.

Continuing with the FIG. 5A sequence, in decision step 174, the question is asked whether the integral is at or over the limit. This is done by examining the ouput of the comparator 116 by means of the microcomputer input line 70.

If the answer in step 174 is "no", then decision step 176 is entered, which asks whether the count in the integral counter register 158 is at or over the limit as recorded in the clock-pulses-per-interval register 156. If the answer is "no", the program loops back to step 174.

If the answer in step 176 is "yes", then, a command clock pulse is generated and, in step 178, the current limit is increased by updating the established current limit register 160, and by transmitting the new value along the output lines 54 through the digital to analog converter 56 an the multiplexer 58 to the sample and hold circuit 128 of the current limit comparator.

Following step 178, the program again loops back to decision step 174.

Thus, the program remains in the loop comprising steps 174, 176 and 178 until the integral in step 174 is at or over the limit, indicating the predetermined motor rotor position has been reached.

When the integral is eventually at or over the limit, the answer in decision step 174 is "yes", whereupon step 180 is entered wherein the current limit is decreased, again via the output line 54, the digital to analog converter 56, the multiplexer 58 and the sample and hold circuit 128. Depending upon whether motor rotor actual position is lagging or leading desired position as indicated by the moment the integral counter 158 is at the limit established by the clock pulses per interval register, a "yes" decision in step 174 may result either before or after step 178 is reached.

Following step 180, decision step 182 is reached, which loops back upon itself until the integral counter 158 is at or over the limit, indicating that the commutation sequence may proceed. However, before advancing to the next step in the program counter sequence, the question is asked whether it is time for another contour point, this being asked in step 184 where the contour point counter register 150 is compared to the clock pulses per point register 148. If the answer is "no", then the program loops back to step 172 to begin another commutation interval. If, however, the answer in step 184 is "yes", then the progrm loops back to step 170, to load in new velocity and direction data as previously described.

While a specific embodiment of the invention has been illustrated and described herein, it is realized that numerous modifications and changes will occur to those skilled in the art. It is, therefore, to be understood that the appended claims are intended to cover all such modifications and changes as fall within the true spirit and scope of the invention.

What is claimed is:

1. A hybrid microcomputer/discrete element control system for an electronically commutated motor having a rotor and a plurality of stator windings operable to produce magnetic fields in response to selective winding energization, said system comprising:

a source of substantially fixed rate basic clock pulses;

a digital computer operating under stored program control, said computer having memory elements for storing data including a present commutation interval register serving as a commutation sequence counter, a clock-pulses-per-interval register serving to record a representation of desired rotational velocity, an internal counter register serving to accumulate a count of basic clock pulses for comparison with the contents of the clock-pulses-per-interval register, and an established current limit register;

means for periodically receiving data stored in the commutation interval register and for selectively energizing the motor windings in response to the received data in a manner appropriate for effecting motor rotation as the data stored in the commutation interval register changes;

an integrator operable to integrate, with respect to time from an initial state, sampled voltage induced in a motor winding not currently energized, thereby to develop a voltage integral;

controlled selector switch means for periodically receiving data stored in the commutation interval register and for selectively connecting the input of said integrator to a currently unenergized motor winding;

a comparator operable to compare the voltage integral to a predetermined reference voltage level and to provide an output signal when the voltage integral exceeds the reference voltage level indicating the rotor has reached a predetermined angular position, and means enabling said computer to periodically sense the output of said comparator;

means for periodically receiving and storing a representation of data in the established current limit register;

means for sensing current through energized motor windings;

a comparator for comparing sensed motor winding current with the stored representation of data in the established current limit register;

a controlled switching device responsive to the output of said motor winding current comparator and connected to interrupt energization of an energized motor winding when sensed current exceeds the established current limit, and to restore motor winding energization when sensed current falls below the established current limit by at least a predetermined amount;

said digital computer operable to establish periodic command clock pulses by incrementing the interval counter register in response to fixed rate basic clock pulses until the contents of the interval counter register have a predetermined relationship to the contents of the clock-pulses-per-interval register;

said digital computer operable to periodically increment or decrement the contents of the present commutation interval register in response to the periodic command clock pulses and to transmit these register contents as data to said means for selectively energizing the motor windings and to said controlled selector switch means; and said digital computer operable to periodically sense the output of said comparator operable to compare the voltage integral and to adjust the contents of the established current limit register depending upon the relative times of occurrence of the command clock pulses and the integral comparator output signal, the current limit being decreased in the event the integral comparator output signal precedes the command clock pulse, and the current limit being increased in the event the integral comparator output follows the command clock pulse.

2. A control system according to claim 1, wherein said controlled selector switch means comprises an analog multiplexer controlled by said computer.

3. A control system according to claim 1, wherein said computer is capable of periodically receiving communications commanding a particular rotational velocity and adjusting the contents of the clock-pulses-per-interval register in response.

4. A control system according to claim 1, wherein:

said computer has further memory elements for storing data including a table comprising a plurality of velocity contour points, a present contour point pointer register serving to indicate which one of the velocity contour points is current, a clock-pulses-per-point register serving to record a representation of desired rate of advancement through the velocity contour points, and a contour point counter register serving to accumulate a count of basic clock pulses for comparison with the contents of the clock-pulses-per-point register; and wherein said computer is further operable to establish periodic contour point clock pulses by incrementing the contour point counter register in response to fixed rate basic clock pulses until the contents of the contour point counter register have a predetermined relationship to the contents of the clock-pulses-per-point register, and operable to increment the present contour point pointer register and cause the data in the identified location in the velocity contour point table to be entered into the clock-pulses-per-interval register to establish a new desired rotational velocity.

5. A control system according to claim 4, wherein said computer is capable of periodically receiving communications commanding a particular velocity profile, and adjusting the contents of the velocity contour point table and of the clock-pulses-per-point register is response.

6. A hybrid microcomputer/discrete element control system for an electronically commutated motor having a rotor and a plurality of stator windings operable to produce magnetic fields in response to selective winding energization, said system comprising:

a digital computer operating under stored program control, said computer having memory elements for storing data including a present commutation interval register serving as a commutation sequence counter and an established current limit register;

means for periodically receiving data stored in the commutation interval register and for selectively energizing the motor windings in response to the received data in a manner appropriate for effecting motor rotation as the data stored in the commutation interval register changes;

an integrator operable to integrate, with respect to time from an initial state, sampled voltage induced in a motor winding not currently energized, thereby to develop a voltage integral;

controlled selector switch means for periodically receiving data stored in the commutation interval register and for selectively connecting the input of said integrator to a currently unenergized motor winding;

a comparator operable to compare the voltage integral to a predetermined reference voltage level and to provide an output signal when the voltage integral exceeds the reference voltage level indicating the rotor has reached a predetermined angular position, and means enabling said computer to periodically sense the output of said comparator;

means for periodically receiving and storing a representation of data in the established current limit register;

means for sensing current through energized motor windings;

a comparator for comparing sensed motor winding current with the stored representation of data in the established current limit register;

a controlled switching device responsive to the output of said motor winding current comparator and connected to interrupt energization of an energized motor winding when sensed current exceeds the established current limit, and to restore motor winding energization when sensed current falls below the established current limit by at least a predetermined amount;

said digital computer operable to periodically produce command clock pulses at a rate dependent upon desired motor rotational velocity;

said digital computer operable to periodically increment or decrement the contents of the present commutation interval register in response to the periodic command clock pulses and to transmit these register contents as data to said means for selectively energizing the motor windings and to said controlled selector switch means; and said digital computer operable to periodically sense the output of said comparator operable to compare the voltage integral and to adjust the contents of the established current limit register depending upon the relative times of occurrence of the command clock pulses and the integral comparator output signal, the current limit being decreased in the event the integral comparator output signal precedes the command clock pulse, and the current limit being increased in the event the integral comparator output follows the command clock pulse.

7. A control system according to claim 6, wherein said controlled selector switch means comprises an analog multiplexer controlled by said computer.

8. A control system according to claim 7, wherein said computer is capable of periodically receiving communications commanding a particular rotational velocity.

* * * * *

UNITED STATES PATENT AND TRADEMARK OFFICE
CERTIFICATE OF CORRECTION

PATENT NO. : 4,250,544
DATED : February 10, 1981
INVENTOR(S) : Robert P. Alley

It is certified that error appears in the above-identified patent and that said Letters Patent are hereby corrected as shown below:

Column 15, line 36, delete "internal" and insert -- interval --.

Column 17, line 5, delete "is" and insert -- in --.

*Signed and Sealed this*

*Twelfth* Day of *May 1981*

[SEAL]

*Attest:*

RENE D. TEGTMEYER

*Attesting Officer*   *Acting Commissioner of Patents and Trademarks*